United States Patent [19]

Weissgerber et al.

[11] 4,296,017

[45] Oct. 20, 1981

[54] GRAFT COPOLYMER PRESSURE-SENSITIVE ADHESIVES, THEIR MANUFACTURE AND USE

[75] Inventors: Rudolf Weissgerber; Alois Stoll; Herbert Kandler; Hans-Herbert Nunner; Christine Eichelseder; Helmut Pangeri, all of Burghausen, Fed. Rep. of Germany

[73] Assignee: Wacker-Chemie GmbH, Munich, Fed. Rep. of Germany

[21] Appl. No.: 113,259

[22] Filed: Jan. 18, 1980

[30] Foreign Application Priority Data

Jan. 31, 1979 [DE] Fed. Rep. of Germany ....... 2903687

[51] Int. Cl.$^3$ .................. C08F 261/04; C08F 263/02; C08F 263/04; C08L 39/06
[52] U.S. Cl. .............................. 260/30.6 R; 260/31.6; 260/32.8 N; 428/355; 428/442; 428/451; 428/463; 428/518; 525/57; 525/59; 525/279
[58] Field of Search ................... 525/279, 57, 59; 260/30.6 R, 31.6; 428/355

[56] References Cited

U.S. PATENT DOCUMENTS 3,911,053  10/1975  Wiest et al. ............................ 525/59

*Primary Examiner*—Stanford M. Levin

*Attorney, Agent, or Firm*—Hammond & Littell, Weissenberger and Muserlian

[57] ABSTRACT

Pressure-sensitive adhesives which contain preferably from 60% to 85% by weight of graft copolymers for use as polymeric pressure-sensitive adhesives, and from 15% to 40% by weight of plasticizers such as phthalate or phosphate plasticizers. The graft copolymer consists of from 5% to 30% by weight of a graft base and from 70% to 95% by weight of grafted-on monomer units. The graft base is a copolymer with from 40% to 85% by weight of ethylene units and from 15% to 60% by weight of vinyl acetate units and optionally up to 10% by weight of monomer units of other unsaturated compounds. It may be replaced wholly or partially by other graft bases. The grafted-on monomer units consist of from 30% to 80% by weight of units of vinyl esters of short-chained carboxylic acids, especially vinyl acetate, from 20% to 70% by weight of units of vinyl esters of relatively long-chained carboxylic acids, for example vinyl laurate, and/or units of esters of $\alpha,\beta$-unsaturated carboxylic acids with relatively long-chained alcohols and/or units of esters of unsaturated dicarboxylic acids with relatively long-chained alcohols, from 0.5% to 15% by weight of N-vinyl-2-pyrrolidone units and from 0 to 20% by weight of other olefinically-unsaturated copolymerizable monomer units.

8 Claims, No Drawings

GRAFT COPOLYMER PRESSURE-SENSITIVE ADHESIVES, THEIR MANUFACTURE AND USE

BACKGROUND OF THE INVENTION

Numerous homopolymers, copolymers, terpolymers, graft polymers and their mixtures with each other and also with naturally occurring resins or waxes have been proposed for use as polymeric adhesives. The demands of modern technology, however, are for ever higher requirements of adhesion and cohesion. Adhesion should take effect immediately on application, if possible. In addition, these properties must not be lost by ageing.

Polymer adhesives of this kind are frequently used as pressure-sensitive adhesives on a great variety of carriers, especially on self-adhesive tags, labels, adhesive tapes, decorative sheets and other types of sheets, and for floor coverings.

Pressure-sensitive adhesives should combine the properties of permanent surface adhesion and cohesion to the greatest possible extent. They are intended to adhere to a wide variety of substrates when subjected to gentle pressure, that is to say, without being pressed on by rubbing and without being moistened with solvents, and to peel off the substrate again without leaving traces of adhesive behind. Transfer of the adhesive from the carrier to the substrate on separation is undesirable.

Pressure-sensitive adhesives previously frequently used commercially are, for example, block copolymers of styrene with isoprene or butadiene and ethylene/vinyl acetate copolymers, which are used as mixtures with low-molecular-weight resins, waxes, plasticizers or solvents.

These pressure-sensitive adhesives can be employed in the industrially advantageous melt-application process only when using polymerization products of low-molecular weight and large additions of low-molecular weight substances, such as those mentioned above. In many cases, however, cohesion and resistance to ageing are impaired thereby. In addition, the adhesives obtained in this manner are only poorly suited for application to plastic material, especially plastic sheets, that have been plasticized with so-called "monomer" plasticizers, for example, phthalate and/or phosphate plasticizers. Examples of such plastic materials are homopolymerization products and copolymerization products of ethylene, propylene, unsaturated esters and/or vinyl chloride.

During ageing, or even more rapidly when a plastic article, especially a sheet, so coated is subjected to an elevated ambient temperature, the plasticizer migrates appreciably into the adhesive layer. The properties of the adhesive are adversely affected as a result: the cohesion decreases sharply, and the adhesive becomes greasy, tends to migrate into porous substrates and to leave behind substantial amounts of adhesive when the plastic article is detached from the substrate again. In the case of plasticized plastic sheets, the migration of plasticizer additionally leads to considerable shrinkage of the sheet. This is apparent, for example, from unsightly dirty edges around the stuck-on sheet. The problem of the sheet shrinking is more especially apparent in the use of decorative sheets of soft polyvinyl chloride (soft PVC), such as are often used both commercially and in the home. In this case, shrinkage of the sheet results in ugly gaps at the edges and butt joints of areas of sheet affixed next to each other.

U.S. Pat. No. 3,911,053 describes ethylene/vinyl ester graft copolymers and their use as hot melt pressure-sensitive adhesives. These graft copolymers, which are particularly suitable, for example, for self-adhesive paper labels, can also be applied to plasticized plastic articles, e.g. plastic sheets. To avoid the above-mentioned disadvantages, these graft copolymerization products have to be mixed additionally with plasticizers, so that further migration of the plasticizer contained in the plastic material into the layer of adhesive is prevented, and, moreover, their K-values must be very high so that the plasticizer-containing adhesive mixtures do not become greasy.

Bonds produced with such adhesives may become loose in the course of time, and, in the case of substrates that adhere well, a large part of the adhesive frequently remains behind on the substrate, subsequently necessitating expensive cleaning operations. The same occurs when detaching the affixed article, for example, a plastic sheet. The fact that the adhesion of the adhesive to the carrier is too slight necessitates an expensive pretreatment of the carrier to improve adhesion. This is usually effected by applying a priming coat, or by physical or chemical treatment, for example, with electrical discharges (corona pre-treatment), by flame-treatment or by mechanical roughening. The pre-treatment of the surface is frequently necessary even with carriers that do not contain plasticizers; for example, textiles, plastics or metals, in order to prevent the pressure-sensitive adhesives of U.S. Pat. No. 3,911,053 from loosening.

Particularly when using relatively large sheets coated with pressure-sensitive adhesive, for example, decorative sheets of plastic or metal, it is easy inadvertently to stick the reverse of the sheet material to itself, that is, with the films of adhesive together. If the pieces of sheet material are then pulled apart, it is generally impossible to separate the two films of adhesive again when the sheets have not been pre-treated, and one of the two films detaches itself from the surface of the sheet on account of too low an adhesion. The adhesive sheet thus becomes useless.

OBJECTS OF THE INVENTION

It is, therefore, an object of the invention to develop pressure-sensitive adhesives that solve the problems mentioned above, that is to say, adhesives which have high adhesion and cohesion, permanent adhesion and resistance to ageing, have no tendency to detach from their carrier, optionally also prevent shrinkage of the carrier and which can be applied by melt application.

Another object of the present invention is the obtaining of a graft copolymer for use as a polymeric pressure-sensitive adhesive consisting of (I) from 5% to 30% by weight of a graft base soluble in the monomer component selected from the group consisting of (i) a copolymer of 40% to 85% by weight of said copolymer of ethylene units, 15% to 60% by weight of said copolymer of vinyl acetate units and 0 to 10% by weight of said copolymer of monomer units copolymerizable with ethylene and vinyl acetate, (ii) said copolymer with up to 10% by weight of said copolymer of vinyl alcohol units derived from vinyl acetate units and (iii) mixtures of 25% to 99.9% by weight of said copolymer with from 0.1% to 75% by weight of other graftable polymers soluble in the monomer component, and (II) from 70% to 95% by weight of a monomer mixture grafted to said graft base consisting of (a) from 30% to 80% by weight of said mixture of vinyl esters of alkanoic acids having 2 to 4 carbon atoms, (b) from 20% to 70% by weight of said mixture of monomers selected from the group consisting of vinyl esters of alkanoic acids having 6 to 18 carbon atoms, esters of $\alpha,\beta$-alkenoic acids, preferably having 3 to 8 carbon atoms, with alkanols having 3 to 18 carbon atoms, esters of alkenedioic acids, preferably having 4 to 8 carbon atoms, with alkanols having 3 to 18 carbon atoms, and mixtures thereof, (c) from 0.5% to 15% by weight of said mixture, of N-vinyl-2 pyrrolidone, (d) from 0 to 20% by weight of other olefinically-unsaturated compounds copolymerizable with said components (a), (b) and (c), and (e) from 0 to 25% by weight of a plasticizer.

A further object of the present invention is the obtaining of a pressure-sensitive adhesive consisting of from 60% to 85% by weight of the above graft copolymer and from 15% to 40% by weight of a plasticizer therefor.

A still further object of the present invention is the development of a process for the production of the above graft copolymer. A yet further object of the present invention is the development of flexible support materials coated on one side with from 5 to 100 gm/m² of the above graft copolymers.

These and other objects of the invention will become more apparent as the description thereof proceeds.

The invention provides pressure-sensitive adhesives containing graft copolymers comprising (A) from 5% to 30% by weight, preferably from 5% to 20% by weight, of a graft base consisting of a copolymer of from 40% to 85% by weight, preferably from 50% to 75% by weight, of ethylene units and from 15% to 60% by weight, preferably from 25% to 50% by weight, of vinyl acetate units, and optionally up to 10% by weight of units of other unsaturated compounds, and (B) from 70% to 95% by weight, preferably from 80% to 95% by weight, of grafted-on monomer units, consisting of (a) from 30% to 80% by weight, preferably from 45% to 75% by weight, of units of vinyl esters of carboxylic acids having from 2 to 4 carbon atoms, (b) from 20% to 70% by weight, preferably from 25% to 45% by weight, of units of vinyl esters of carboxylic acids having from 6 to 18 carbon atoms and/or units of esters of $\alpha,\beta$-unsaturated carboxylic acids with alcohols having from 3 to 18 carbon atoms, and/or units of monoesters or diesters of unsaturated dicarboxylic acids with alcohols having from 3 to 18 carbon atoms. (c) from 0.5% to 15% by weight, preferably from 1% to 10% by weight, of N-vinyl-2-pyrrolidone units, and (d) from 0 to 20% by weight of other olefinically-unsaturated copolymerizable monomer units.

The graft base, the ethylene/vinyl acetate copolymer, may be replaced wholly or partially, preferably up to 75% by weight, especially up to from 15% to 60% by weight, by other polymers soluble in the monomer mixture, especially polyvinyl ethers and/or mixed polymerization products of ethylene with esters of acrylic acid and/or methacrylic acid with alcohols having from 2 to 8 carbon atoms, preferably alkanols having from 2 to 8 carbon atoms.

More particularly, the present invention relates to a graft copolymer for use as a polymeric pressure-sensitive adhesive consisting of (I) from 5% to 30% by weight of a graft base soluble in the monomer component selected from the group consisting of (i) a copolymer of 40% to 85% by weight of said copolymer of ethylene units, 15% to 60% by weight of said copolymer of vinyl acetate units and 0 to 10% by weight of said copolymer of monomer units copolymerizable with ethylene and vinyl acetate, (ii) said copolymer with up to 10% by weight of said copolymer of vinyl alcohol units derived from vinyl acetate units and (iii) mixtures of 25% to 99.9% by weight of said copolymer with from 0.1% to 75% by wegnt of other graftable polymers soluble in the monomer component, and (II) from 70% to 95% by weight of a monomer mixture grafted to said graft base consisting of (a) from 30% to 80% by weight of said mixture of vinyl esters of alkanoic acids having 2 to 4 carbon atoms, (b) from 20% to 70% by weight of said mixture of monomers selected from the group consisting of vinyl esters of alkanoic acids having 6 to 18 carbon atoms, esters of $\alpha,\beta$-alkenoic acids, preferably having 3 to 8 carbon atoms, with alkanols having 3 to 18 carbon atoms, esters of alkenedioic acids, preferably having 4 to 8 carbon atoms, with alkanols having 3 to 18 carbon atoms, and mixtures thereof, (c) from 0.5 to 15% by weight of said mixture, of N-vinyl-2 pyrrolidone, (d) from 0 to 20% by weight of other olefinically-unsaturated compounds copolymerizable with said components (a), (b) and (c), and (e) from 0 to 25% by weight of a plasticizer.

The graft copolymerization products according to the invention are manufactured by dissolving the graft base copolymer or copolymers in the monomer mixture and graft-polymerizing the mixture in the presence of free-radical initiators, especially monomer-soluble free-radical initiators, in amounts of from 0.02% to 4%, preferably from 0.08% to 0.8% by weight based on the monomer mixture, at $-20°$ to $150°$ C. As graft base, there may be considered primarily commercially available ethylene/vinyl acetate copolymers that have been polymerized by free-radical initiation according to known methods, for example in aqueous emulsion, in bulk or in solution. The ethylene content is preferably from 50% to 75% by weight, and the copolymers have in most cases a melt index ($i_2$) ranging from 5 to 200, preferably from 5 to 100. They may, in addition, contain up to 10% by weight of unsaturated compounds copolymerizable with ethylene and vinyl acetate, in particular unsaturated carboxylic acids such as alkenoic acids having 3 to 8 carbon atoms, like acrylic acid, copolymerized in the copolymer. Also copolymers with up to 10% by weight of vinyl alcohol units are optionally usable as are obtained by a partial saponification of the ethylene/vinyl acetate copolymer. Generally, from 5% to 30% by weight, preferably 5% to 20% by weight, of copolymer, based on the solution of the copolymer in the monomer mixture, is used.

Furthermore, it is also possible to use or co-use as the graft base other polymers soluble in the monomer mixture and already mentioned above, instead of corresponding amounts of ethylene/vinyl acetate copolymerization products. Particular examples of these copolymers are polyvinyl-lower alkyl ethers such as polyvinyl ethyl ether, polyvinyl propyl ether and polyvinyl isobutyl ether.

Examples of the monomers mentioned under (a) are the vinyl alkanoates having 4 to 6 carbon atoms, such as vinyl propionate, vinyl butyrate and, preferably, vinyl acetate. They are used preferably in amounts ranging from 45% to 75% by weight, based on the total amount of monomers. Mixtures thereof may also be used.

Examples of vinyl esters with carboxylic acids having from 6 to 18 carbon atoms listed under (b) are vinyl alkanoates having from 8 to 20 carbon atoms, such as vinyl 2-ethylhexanoate, vinyl caproate, vinyl caprate, vinyl isononanoate, vinyl esters of the Versatic ® acids, vinyl laurate and vinyl stearate. Mixtures thereof may also be used.

Examples of α,β-unsaturated carboxylic acids and unsaturated dicarboxylic acids are the α,β-alkenoic acids having from 3 to 8 carbon atoms, such as acrylic acid, methacrylic acid, crotonic acid, etc., and the alkenedioic acids having from 4 to 8 carbon atoms, such as itaconic acid, fumaric acid and maleic acid, and examples of straight-chain or branched alcohols which may be esterified with them are the alkanols having from 3 to 18 carbon atoms, such as propanol, butanol, 2-ethylhexanol, stearyl alcohol and the epoxyalkanols having from 3 to 18 carbon atoms such as glycidyl alcohol. The monomers may be used alone or in admixture, preferably in amounts ranging from 25% to 45% by weight, based on the total amount of monomers. Mixtures thereof may also be used.

N-vinyl-2-pyrrolidone is preferably added to the monomer mixture in amounts ranging from 1% to 10% by weight, based on the total amount of monomers.

Optionally, up to 20% by weight of other monomers, copolymerizable with the monomer components (a), (b) and (c), based on the total amount of monomers, may be co-used. Preferably under consideration are the unsaturated acids, more particularly the α,β-alkenoic acids having 3 to 8 carbon atoms and the alkenedioic acids having 4 to 8 carbon atoms, as for example acrylic, methacrylic, crotonic, fumaric and maleic acid, but also acrylamide, N-lower alkyl-substituted acrylamides, methacrylamide, α,β-olefins having 2 to 7 carbon atoms such as ethylene, propylene, styrene, acrylonitrile and vinyl chloride. Also their mixtures may be used.

To be able to carry out the grafting, the graft base copolymer (possibly with the additional polymers) is dissolved in the monomer mixture. Free-radical-formers for initiating the grafting may be, for example, the oil-soluble compounds, such as azo or peroxy compounds such as azo-isobutyronitrile, lauroyl peroxide, t.-butyl hydroperoxide, benzoyl peroxide, diisopropyl peroxydicarbonate, 2,2-bis-(tert. butylperoxy)butane and butyl perpivalate. Also redox systems of reducing agents, such as hydrazines, amines, and sulfinic acids, and peroxides may be used. To obtain uniform polymerization and complete conversion, several catalysts may be used, optionally adding them proportionately over the entire time of polymerization.

In addition to the above charge of graft base copolymer, monomers and free-radical initiators, the polymerization batch can optionally contain up to 25% by weight of the polymerization batch of a plasticizer, particularly a monomer plasticizer as discussed hereinafter.

The graft polymerization is carried out at $-20°$ to $150°$ C., preferably at $50°$ to $130°$ C., with the temperature frequently being increased during polymerization, and usually under the autogeneous pressure of the monomers. When using gaseous monomers, such as ethylene, for example, it is frequently necessary to apply an elevated pressure. Generally, this does not need to be higher than 140 bar (absolute), preferably from 20 to 120 bar (absolute).

In some cases, it is advantageous not to introduce the total mixture of monomers, but to meter-in parts thereof or to introduce only individual monomers of the monomer mixture, and to add the remainder during the polymerization. The polymerization may also be started only with a portion of the polymerization product dissolved in the monomer and with further addition of the monomer/copolymer mixture during polymerization.

The K-value of the product manufactured in this way should generally lie between 45 and 80, preferably between 50 and 70, measured in accordance with Fikentscher in a 1% acetone solution. This value may optionally be adjusted to the desired level by the addition to the polymerization batch of polymerization or molecular weight regulators, such as aldehydes, halohydrocarbons or mercaptans, for example.

The pressure-sensitive adhesives according to the invention are sticky, viscous compositions, the properties of which correspond to the properties required as set forth above. Additionally, in many cases the articles provided with a pressure-sensitive adhesive can be detached from the substrate again, without traces of adhesive being left behind.

The pressure-sensitive adhesives according to the invention can be applied to the carriers in the molten state using devices customary for melt applications, for example, using nozzle or roller application systems. Examples of suitable carrier materials are textiles, metal sheets, paper and plastic materials. The pressure-sensitive adhesives according to the invention are especially suitable for plastic sheets, especially PVC sheets. The pressure-sensitive adhesives are ordinarily applied to the carrier in amounts of from 5 to 100 gm/m$^2$.

Unexpectedly, the adhesion of the pressure-sensitive adhesive according to the invention is generally much improved compared with, for example, the pressure-sensitive adhesive of U.S. Pat. No. 3,911,053, on carriers, especially plastic sheets, not pre-treated to improve adhesion.

If the pressure-sensitive adhesives according to the invention are applied to carriers containing plasticizers, for example, carriers of plastic material, especially to plastic sheets containing plasticizers, and more especially to PVC sheets, they are preferably likewise formulated/mixed with plasticizers.

Such pressure-sensitive adhesive mixtures then preferably contain from 60% to 85% by weight of one or more of the above-defined graft copolymerization products and from 15% to 40% by weight of one or more plasticizers, based on the mixture of graft copolymerization products and plasticizers.

Unexpectedly, sheets coated with these pressure-sensitive adhesives made from graft copolymerization products and plasticizers can generally be pulled off substrates again without the pressure-sensitive adhesive becoming detached from the carrier sheet, even when the surface thereof has not been subjected to an expensive pre-treatment to improve adhesion.

Preferred plasticizers used according to the invention are the so-called "monomer" plasticizers. These are particularly esters of carboxylic acids with alcohols having from 4 to 13 carbon atoms, and/or tert.-phosphoric acid esters having optionally substituted alkyl groups having from 2 to 10 carbon atoms, particularly haloalkyls, and/or optionally alkyl-substituted phenyl groups. Particularly preferred carboxylic acid esters are diesters of phthalic acid with alkanols having from 4 to 13, preferably from 4 to 8, carbon atoms, and also diesters of sebacic acid and adipic acid with alkanols having from 6 to 10 carbon atoms. Particularly preferred tert.-phosphoric acid esters are, for example, tricresyl phosphate, dicresylphenyl phosphate, cresyl-diphenyl phosphate, triphenyl phosphate, xylenyl-diphenyl phosphate, dixylenyl-phenyl phosphate, tris (chloroethyl) phosphate, diphenyl-octyl phosphate, phenyl-dioctyl phosphate and trioctyl phosphate. The monomer plasticizers may, of course, be used alone or as a mixture.

The pressure-sensitive adhesives according to the invention may have other customary additives added to them, for example, colophony resins, colophony resin derivatives, cumarene resins, indene resins, phenol-formaldehyde resins and hydrocarbon resins, waxes, paraffin oils, solvents, pigments, other polymerization products and/or soluble dyestuffs. If desired, such additives are added in amounts preferably up to a total of about 25% by weight, more especially up to about 15% by weight, calculated on the final pressure-sensitive adhesive mixture.

The pressure-sensitive adhesive of the present invention, therefore, preferably contains from 60% to 85% by weight of one or more of the above-defined graft polymerization products, from 10% to 40% by weight of one or more plasticizers where the total amount of plasticizers in the overall adhesive composition is at least 15% by weight, and from 0 to 25% by weight of conventional pressure-sensitive adhesive additives of the type: natural and synthetic resins, natural and synthetic waxes, paraffin oils, solvents, pigments and dyestuffs.

The following examples are illustrative of the invention without being limitative thereto.

EXAMPLES

In the following examples details are given of the tack (surface stickiness), peel strength (adhesive power) and adhesion to PVC sheet plasticized with monomer plasticizers of coatings produced with pressure-sensitive adhesives according to the invention.

The term "adhesive strips", which is used several times, means strips of flexible, sheet-like carrier material coated with a film of a pressure-sensitive adhesive according to the invention.

For all the measurements, the pressure-sensitive adhesives tested were applied, in a thickness of 25 gm/m$^2$, to the carrier materials with a coating knife at adhesive melt temperatures of from 130° C. to 180° C., or the film of adhesive was produced on siliconized paper and laminated onto the carrier material (reversal process).

The numerical data is based on the following methods of analysis.

(a) Tack (surface stickiness)

An adhesive strip 20 cm long and 2.5 cm wide (carrier material: PVC containing polymer plasticizers, 0.1 mm thick) is clamped in the form of a "loop" in the upper jaw of a tensile-testing machine so that it hangs vertically with the layer of adhesive on the outside. A carefully cleaned glass plate is secured horizontally to the lower jaw. A length of about 3 cm of the "loop" is then placed, without applying pressure, on the horizontally secured, carefully cleaned glass plate by moving the two jaws of the tensile-testing machine vertically together at a speed of 100 mm/min. At the same speed, the adhesive strip is then pulled away from the surface of the glass. The highest force required for pulling away the "loop" serves as a measure of the surface stickiness.

The value given is the mean value from 5 separate measurements, a fresh adhesive strip and a fresh glass surface being used each time.

(b) Peel strength (adhesive power)

An adhesive strip 20 cm long and 2.5 cm wide (the same as described under (a)) is placed, starting from one end and for a length of about 12 cm and in such a way that no air bubbles form, on a carefully cleaned plate of V4A steel. By rolling five times (backwards and forwards) with a 2.2 kg steel roller covered with silicone rubber, the adhesive strip is pressed onto the steel plate. After a storage time of 8 minutes or 24 hours duration at 23° C. and 50% relative atmospheric humidity, a 5 cm length of the adhesive strip is pulled off at a speed of 78 mm/min at an angle of 180°. The average force required for this is measured. The values given are mean values from 5 separate measurements in each case.

The steel plates used in the tests are cleaned (in the order given) by mechanical removal of visible traces of dirt using water and, optionally, detergents, rinsing with distilled water, storage in a methyl ethyl ketone bath and in an ethanol bath. Before using the test surfaces thus cleaned, the plates are kept for at least 48 hours in an air-conditioned room at 23° C. and 50% relative atmospheric humidity.

(c) Adhesion to soft PVC sheets

The adhesion to a PVC sheet containing monomer plasticizers was assessed in accordance with several methods. The test sheet was the matte side of a 0.1 mm thick white PVC sheet plasticized with monomer plasticizers, such as is used commercially for decorative sheets.

For the first type of test a 25 gm/m$^2$ film of adhesive is applied to the test sheet that had not been pre-treated to improve adhesion. The coating is then covered with silicone paper and stored for one week at room temperature.

An adhesive strip of 2.5 cm width and 20 cm length is then uniformly glued over its entire surface area to a 0.1 mm thick soft PVC sheet (auxiliary PVC sheet) that had been subjected to a pre-treatment to improve adhesion. In order to ensure a very good bond, the composite structure of carrier sheet (not pre-treated)/film of adhesive/auxiliary PVC sheet (pre-treated) was pressed in a flat press at a pressure of about 25 bar for 3 minutes, then heat-treated for 15 minutes at 60° C. and then again pressed for 3 minutes at about 25 bar. The adhesion-improving pre-treatment of the auxiliary sheet was effected by the application of an adhesion-promoter or by electrical discharge (corona).

The composite structure is separated using a tensile-testing machine by clamping one end of the carrier sheet in the upper jaw and the corresponding end of the auxiliary PVC sheet in the lower jaw of the tensile-testing machine and moving the jaws apart at a speed of 80 mm/min. The mean value of the force required for the separation, over a length of 5 cm of the adhesive composite structure, is recorded.

When separating the adhesive composite structure, care must be taken that the end of the composite structure still bonded forms an angle of as near 90° as possible with the two parts of sheet already separated.

During the separation, the adhesive composite structure can break at three places: at the interface of adhesive film/carrier sheet (not pre-treated to improve adhesion), in the film of adhesive (splitting of the film of adhesive), and at the interface of adhesive film/auxiliary PVC sheet (pre-treated to improve adhesion). The last case need not be considered, because it does not occur in practice.

Of the two other cases, the one for which the smaller pulling force is required will occur.

If the separation occurs at the adhesive/carrier sheet (not pre-treated to improve adhesion) interface (adhesion break), the force measured is used as a measure of the sheet adhesion.

If the break occurs in the film of adhesive, that is, if the film of adhesive splits (cohesion break), the force measured is taken as a measure of the cohesion of the adhesive. In this case, the adhesion of the sheet can no longer be determined because it must be greater than the cohesion and only the smaller of the two forces can be measured.

(d) Separation of layers of adhesive affixed to one another.

A second, more qualitative test for adequate adhesion of the sheet consists in placing, one on top of the other, two adhesive strips each of PVC sheet containing monomer plasticizers and not pre-treated to improve adhesion and coated with identical films of pressure-sensitive adhesive according to the invention with the films of adhesive together, by rolling them together five times (backwards and forwards) with a 2.2 kg steel roller covered in silicone rubber, and separating the composite structure again by hand after 10 minutes. Approximately the same amount of adhesive should remain on both sheets (splitting in the film of adhesive) that is, detachment of the film of adhesive from one sheet (transfer of adhesive) is undesirable.

Determination of the K-values of the polymerization products is effected in accordance with Fikentscher measured in a 1% acetone solution, calculated on the graft copolymer. The viscosities of the polymerization products or the mixtures of adhesive are measured with a consistometer manufactured by the firm of Haake Messtechnik GmbH. The measuring device VIIg is used. The rate of feed of the nozzle is set to 0.1 mm/sec by suitable loading. The data of the measured values of the tack, the peel strength and the adhesion to soft PVC sheet in "Newtons" refers always to adhesive strips having a width of 2.5 cm.

EXAMPLE 1

In a 2 liter reaction vessel, equipped with stirrer, reflux condenser, nitrogen inlet tube and internal thermometer, 65 gm of an ethylene/vinyl acetate copolymer having a vinyl acetate content of 40% by weight and a melt index of $i_2 = 60$ were dissolved, under reflux and while stirring at 70° C., in a mixture of 400 gm of vinyl acetate, 170 gm of vinyl laurate, 35 gm of N-vinyl-2-pyrrolidone, 0.4 gm of acetaldehyde and 60 gm of diisodecyl phthalate, and the whole was cooled to room temperature. 1.2 gm of benzoyl peroxide and 0.5 gm of 2,2-bis-(tert.-butylperoxy)-butane were then added and, while stirring and with a weak stream of nitrogen passing through, the polymerization was initiated by heating for a short time. The main phase of the polymerization commenced at an internal temperature of 65° C., and had finished after about 4 hours with the temperature increasing to 75° C. 0.8 gm of tert.-butyl perpivalate was added and the temperature was slowly increased over the course of 60 minutes to 130° C., the reflux coming to an end. The temperature was maintained at 130° C. for a further 30 minutes. A clear homogeneous speck-free polymerization melt was obtained, which solidified to a viscous elastic sticky composition after cooling. The K-value of the graft polymerization product was 61. A mixture of the resulting polymerization product containing plasticizers with a further 270 gm of diisodecyl phthalate, 50 gm of a polyethylene wax having a melting point of 100° C. and 50 gm of a hydrocarbon resin having a softening point (ring and ball) of 100° C. yielded an adhesive mixture having a viscosity of 39 000 mPa's at 150° C.

The tack of coatings produced with the adhesive mixture was 3 N. The peel strengths after 8 minutes and 24 hours bonding duration were 4 N and 8 N. In the test for adhesion to PVC sheet plasticized with monomer plasticizers in accordance with test method (c), splitting in the film of adhesive at a force of 8 N occurred, i.e., the sheet adhesion was greater than 8 N. A test in accordance with test method (d) produced splitting in the film of adhesive.

COMPARISON EXAMPLE A

In the same arrangement as that described in Example 1, 55 gm of an ethylene/vinyl acetate copolymer having a vinyl acetate content of 40% by weight and a melt index of $i_2 = 60$, were dissolved in a mixture of 330 gm of vinyl acetate, 155 gm of vinyl laurate and 60 gm of diisodecyl phthalate at 70° C. and the mixture was then cooled again. After addition of 0.8 gm of benzoyl peroxide, 0.5 gm of 2,2-bis-(tert.-butyl-peroxy)-butane and 1 gm of acetaldehyde, the mixture was heated. Polymerization commenced at an internal temperature of 65° C. After about 90 minutes, the polymerization had finished with the internal temperature increasing to 75° C. 0.8 gm of tert.-butyl perpivalate was added and the temperature was slowly increased to 130° C. over the course of 60 minutes. The temperature was maintained at this level for a further 30 minutes.

At about 130° C., a further 200 gm of diisodecyl phthalate and 45 gm of a polyethylene wax having a melting point of 100° C. and 45 gm of a hydrocarbon resin having a softening point of 100° C. were added to the melt. A clear homogeneous adhesive melt was obtained, which formed a viscous elastic sticky composition on cooling. The K-value of the graft polymerization product was 62. The viscosity of the adhesive melt was 37 000 mPa's at 150° C.

The tack of coatings produced with the adhesive was 2.8 N. The peel strengths after 8 minutes and 24 hours bonding duration were 4.5 and 7 N.

In the test for adhesion to PVC sheet plasticized with monomer plasticizers in accordance with test method (c), a measured value of the sheet adhesion of 5.7 N was found. In the test in accordance with test method (d), an almost total transfer of adhesive was observed.

EXAMPLE 2

In the same system as that described in Example 1, 32 gm of an ethylene/vinyl acetate copolymer having a vinyl acetate content of 40% by weight and a melt index of $i_2 = 60$, and 32 gm of polyvinyl isobutyl ether having a K-value of 120 were dissolved, while heating at 70° C., in a mixture of 360 gm of vinyl acetate, 200 gm of vinyl laurate and 24 gm of N-vinyl-2-pyrrolidone. The mixture was then cooled again. After the addition of 1.2 gm of benzoyl peroxide and 0.5 gm of 2,2-bis-(tert.-butylperoxy)-butane, the mixture was heated. Polymerization commenced at an internal temperature of about 65° C.

After 3 hours and 4 hours polymerization at about 71° C., 1 gm each time of butyl perpivalate was added. The temperature was then slowly increased to 120° C. within 60 minutes, the reflux ceasing. A clear speck-free viscous melt was obtained. The K-value of the polymerization product was 59. Thereafter, 270 gm of diisodecyl phthalate, 45 gm of a polyethylene wax having a melting point of 100° C. and 45 gm of a hydrocarbon resin having a softening point of 100° C. were incorporated into the melt.

The viscosity of the resulting homogeneous mixture was 22 000 mPa's at 150° C. The tack of coating produced with the adhesive was 4.3 N. The peel strengths after 8 minutes and 24 hours bonding duration were found to be 3 N and 9 N.

In the test for adhesion to PVC sheet plasticized with monomer plasticizers in accordance with test method (c), splitting in the film of adhesive (cohesion break) was observed at a force of 6.5 N (cohesion value), that is, the sheet adhesion was greater than 6.5 N. A test in accordance with test method (d) showed splitting in the film of adhesive.

COMPARISON EXAMPLE B

In the same system as that described in Example 1, 28 gm of an ethylene/vinyl acetate copolymer having a vinyl acetate content of 40% by weight and a melt index of $i_2 = 60$, and 28 gm of polyvinyl isobutyl ether having a K-value of 120, were dissolved in a mixture of 330 gm of vinyl acetate and 170 gm of vinyl laurate while heating to about 70° C. After cooling, 0.8 gm of benzoyl peroxide and 1.2 gm of 2,2-bis-(tert.-butylperoxy)-butane were added. On re-heating, polymerization commenced at approximately 65° C. After 2 hours, the main polymerization had finished. The internal temperature was about 75° C. The reaction mixture was heated over the course of 60 minutes to 120° C., where the reflux ceased. The K-value of the polymer was 57. 240 gm of diisodecyl phthalate, 40 gm of a polyethylene wax having a melting point of 100° C. and 40 gm of a hydrocarbon resin having a softening point of 100° C. were incorporated into the melt. The viscosity of the homogeneous speck-free adhesive mixture was 20 000 mPa's at 150° C. The tack of coatings produced with the adhesive was 4.1 N. The peel strengths after 8 minutes and 24 hours bonding duration were determined as 2 N and 6 N. In the test for adhesion to PVC sheet plasticized with monomer plasticizers in accordance with test method (c), partial adhesion break and partial cohesion break were observed at 5.9 N., that is to say, the sheet adhesion and the cohesion are about the same. A test in accordance with test method (d) showed an almost complete transfer of adhesive.

EXAMPLE 3

In the same system as that described in Example 1, 65 gm of an ethylene/vinyl acetate copolymer having a vinyl acetate content of 18% by weight and a melt index of $i_2 = 150$, were dissolved in a mixture of 370 gm of vinyl acetate, 190 gm of vinyl laurate, 29 gm of N-vinyl-2-pyrrolidone and 150 gm of diisodecyl phthalate while heating at about 70° C. The mixture was then cooled to room temperature. 1.5 gm of benzoyl peroxide and 1 gm of 2,2-bis-(tert.butylperoxy)-butane were added and the mixture was heated while stirring, the main phase of the polymerization commencing at an internal temperature of 65° C. and progressing for 4 hours to an internal temperature of about 72° C. 0.8 gm of tert.-butyl perpivalate was then added and the mixture was slowly heated over the course of one hour to 130° C. Reflux ceased. The K-value of the resulting graft polymerization product was 62.

After incorporating 50 gm of a polyethylene wax having a melting point of 100° C., 20 gm of a hydrocarbon resin having a softening point of 110° C. and 140 gm of diisodecyl phthalate, an adhesive mixture having a viscosity of 27 000 mPa's at 150° C. was obtained.

The track of coatings produced with the adhesive mixture was 4.5 N. The peel strengths after 8 minutes and 24 hours bonding duration were 5.5 N and 9 N. In the test for adhesion to PVC sheet plasticized with monomer plasticizers in accordance with test method (c), a sheet adhesion value of 5.3 N was found.

COMPARISON EXAMPLE C

In the same system as that described in Example 1, 55 gm of an ethylene/vinyl acetate copolymer having a vinyl acetate content of 18% by weight and a melt index of $i_2 = 150$, were dissolved, while heating, in a mixture of 335 gm of vinyl acetate, 165 gm of vinyl laurate and 120 gm of diisodecyl phthalate. The mixture was then cooled. 1 gm of benzoyl peroxide and 0.8 gm of 2,2-bis-(tert.-butul-peroxy)-butane were added and the polymerization was started while stirring and heating. It commenced at about 65° C. and had for the most part finished after 90 minutes. During this time the temperature slowly increased to 74° C. Heating was continued for a further half-hour at 100° C., the reflux ceasing. The K-value of the graft polymerization product obtained was 66.

After addition of 45 gm of a polyethylene wax having a melting point of 100° C., 20 gm of a hydrocarbon resin of softening point 110° C. and 120 gm of diisodecyl phthalate, an adhesive mixture having a viscosity of 35 000 mPa's at 150° C. was obtained.

The tack of coatings produced with the adhesive mixture was 4 N. The peel strengths after 8 minutes and 24 hours bonding duration were 5 N and 8 N. In the test for adhesion to PVC sheet plasticized with monomer plasticizers in accordance with test method (c), a sheet adhesion value of 2.9 N was found.

The preceding specific embodiments are illustrative of the practice of the invention. It is to be understood, however, that other expedients disclosed herein or known to those skilled in the art may be employed without departing from the spirit of the invention or the scope of the appended claims.

We claim:

1. A graft copolymer for use as a polymeric pressure-sensitive adhesive consisting of
(I) from 5% to 30% by weight of a graft base soluble in the monomer component selected from the group consisting of
 (i) a copolymer of 40% to 85% by weight of said copolymer of ethylene units, 15% to 60% by weight of said copolymer of vinyl acetate units and 0 to 10% by weight of said copolymer of monomer units copolymerizable with ethylene and vinyl acetate,
 (ii) said copolymer with up to 10% by weight of said copolymer of vinyl alcohol units derived from vinyl acetate units, and
 (iii) mixtures of 25% to 99.9% by weight of said copolymer with from 0.1% to 75% by weight of other graftable polymers soluble in the monomer component, and
(II) from 70% to 95% by weight of a monomer mixture grafted to said graft base consisting of
 (a) from 30% to 80% by weight of said mixture of vinyl esters of alkanoic acids having 2 to 4 carbon atoms, (b) from 20% to 70% by weight of said mixture of monomers selected from the group consisting of vinyl esters of alkanoic acids having 6 to 18 carbon atoms, esters of α,β-alkenoic acids having 3 to 8 carbon atoms, with alkanols having 3 to 18 carbon atoms, esters of alkenedioic acids having 4 to 8 carbon atoms, with alkanols having 3 to 18 carbon atoms, and mixtures thereof, (c) from 0.5% to 15% by weight of said mixture, of N-vinyl-2-pyrrolidone, (d) from 0 to 20% by weight of other olefinically-unsaturated compounds copolymerizable with said components (a), (b) and (c), and (e) from 0 to 25% by weight of a plasticizer.

2. The graft polymers of claim 1 wherein said graft base contains from 15 to 50% by weight of other graftable polymers soluble in the monomer component.

3. The graft polymers of claim 2 wherein said other graftable polymers are polyvinyl lower alkyl ethers.

4. The graft polymers of claim 1 wherein said graft base copolymer of ethylene and vinyl acetate has a melt index ($i_2$) of from 5 to 100.

5. A pressure-sensitive adhesive containing from 60% to 85% by weight of the graft copolymer of claim 1, from 10% to 40% by weight of a monomer plasticizer, where the total amount of said plasticizer in the adhesive is at least 15% by weight, and from 0 to 25% by weight of pressure-sensitive adhesive additives selected from the group consisting of natural and synthetic resins, natural and synthetic waxes, paraffin oils, solvents, pigments and dyestuffs.

6. The pressure-sensitive adhesive of claim 5 wherein said monomeric plasticizer is a polyester of an organic polycarboxylic acid with an alkanol having from 4 to 13 carbon atoms.

7. The pressure-sensitive adhesive of claim 5 wherein said monomeric plasticizer is a tertiary phosphonic acid ester with an alcohol selected from the group consisting of alkanols having from 2 to 10 carbon atoms, haloalkanols having from 2 to 10 carbon atoms, phenol and alkylphenols having from 1 to 4 carbon atoms in the alkyls.

8. A pressure-sensitive adhesive-backed laminate consisting of a carrier material having applied to one side thereof from 5 to 100 gm/m$^2$ of at least one pressure-sensitive adhesive of claim 5.

* * * * *

UNITED STATES PATENT AND TRADEMARK OFFICE
CERTIFICATE OF CORRECTION

PATENT NO. : 4,296,017
DATED : October 20, 1981
INVENTOR(S) : RUDOLF WEISSGERBER ET AL.

It is certified that error appears in the above—identified patent and that said Letters Patent is hereby corrected as shown below:

Title page [75]: The name of the inventor "Helmut Pangeri"

should read -- Helmut Pangerl --.

Column 4, line 8: "weignt" should read -- weight --.

Signed and Sealed this

Thirteenth Day of April 1982

|SEAL|

Attest:

Attesting Officer

GERALD J. MOSSINGHOFF

Commissioner of Patents and Trademarks